(12) United States Patent
Abdelaziz et al.

(10) Patent No.: US 12,314,360 B2
(45) Date of Patent: *May 27, 2025

(54) SUPERVISED LEARNING SYSTEM FOR IDENTITY COMPROMISE RISK COMPUTATION

(71) Applicant: Microsoft Technology Licensing, LLC, Redmond, WA (US)

(72) Inventors: Sayed Hassan Abdelaziz, Redmond, WA (US); Maria Puertas Calvo, Seattle, WA (US); Laurentiu Bogdan Cristofor, Redmond, WA (US); Rajat Luthra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,897

(22) Filed: Dec. 18, 2023

(65) Prior Publication Data
US 2024/0119129 A1    Apr. 11, 2024

Related U.S. Application Data

(63) Continuation of application No. 16/165,255, filed on Oct. 19, 2018, now Pat. No. 11,899,763.
(Continued)

(51) Int. Cl.
*H04L 9/00* (2022.01)
*G06F 21/31* (2013.01)
(Continued)

(52) U.S. Cl.
CPC .......... *G06F 21/316* (2013.01); *G06N 20/00* (2019.01); *H04L 63/102* (2013.01);
(Continued)

(58) Field of Classification Search
CPC ...... G06F 21/316; G06F 21/41; G06F 21/552; G06N 20/00; G06N 3/044; G06N 3/045; G06N 5/01; G06N 20/10; G06N 20/20; H04L 63/102; H04L 63/105; H04L 63/1441; H04L 63/308; H04L 63/0815; H04L 63/1425
See application file for complete search history.

(56) References Cited

U.S. PATENT DOCUMENTS 11,347,896 B1 *    5/2022    Brown, Jr. ............... G06F 21/73
2015/0339477 A1 *  11/2015    Abrams ............... H04L 63/1416
                                                    726/23
(Continued)

OTHER PUBLICATIONS

U.S. Appl. No. 16/165,255, filed Oct. 19, 2018.
(Continued)

*Primary Examiner* — Syed M Ahsan
(74) *Attorney, Agent, or Firm* — Workman Nydegger

(57) ABSTRACT

Systems are provided for improving computer security systems that are based on user risk scores. These systems can be used to improve both the accuracy and usability of the user risk scores by applying multiple tiers of machine learning to different the user risk profile components used to generate the user risk scores and in such a manner as to dynamically generate and modify the corresponding user risk scores.

20 Claims, 10 Drawing Sheets

Related U.S. Application Data

(60) Provisional application No. 62/732,470, filed on Sep. 17, 2018.

(51) Int. Cl.
    *G06N 20/00*     (2019.01)
    *H04L 9/40*     (2022.01)

(52) U.S. Cl.
    CPC ........ *H04L 63/105* (2013.01); *H04L 63/1441* (2013.01); *H04L 63/308* (2013.01)

(56) References Cited

U.S. PATENT DOCUMENTS

| | | | |
|---|---|---|---|
| 2018/0069867 A1* | 3/2018 | Grajek | G06N 7/00 |
| 2020/0028862 A1* | 1/2020 | Lin | H04L 63/104 |

OTHER PUBLICATIONS

U.S. Appl. No. 62/732,470, filed Sep. 17, 2018.
U.S. Appl. No. 16/188,834, filed Nov. 13, 2018.
"Notice of Allowance Issued in European Patent Application No. 19740265.4", Mailed Date: Nov. 16, 2023, 8 Pages.

* cited by examiner

300

⟳ Refresh  ↓ Download  ⚠ Confirm compromised  ⊙ Confirm safe

| User | Application | Sign-in status | Date | IP address | Sign-in risk state |
|---|---|---|---|---|---|
| *Enter user* | *Enter app name* | *All* | *Last 7 days* | *Enter IP address* | *Active, Remediated* |
| Sign-in risk level (Total) | Sign-in risk level | Conditional access | Multi-factor authentication | Risk event type(s) | |
| *Low, Medium, High* | *Low, Medium, High* | *All* | *All* | *Unfamiliar features* | |

Apply  Reset

| USER ^ | APPLICATION ^ | SIGN-IN STATUS | DATE | IP ADDRESS | RISK STATE | RISK LEVEL (TOTAL) | RISK LEVEL (REALTIME) | |
|---|---|---|---|---|---|---|---|---|
| ☑ Garret O | Office.com | Success | 7/3/17 | 128.93.34.24 | At risk | Medium | Medium | ⋯ |
| ☐ Alvin V | Azure Portal | Failure | 7/2/17 | 234.32.45.46 | Confirmed Safe | | Low | ⋯ |
| ☐ Toshi H | Azure Portal | Success | 7/2/17 | 94.12.53.45 | At risk | Medium | Medium | ⋯ |
| ☐ Elissa N | Azure Portal | Failure | 7/2/17 | 123.34.65.1 | At risk | Medium | Medium | ⋯ |
| ☐ Audrey O | Microsoft Office | Success | 7/2/17 | 231.23.54.245 | At risk | Low | Low | ⋯ |
| ☐ Henry H | Microsoft Office | Success | 7/2/17 | 231.23.54.245 | At risk | Medium | Medium | ⋯ |
| ☐ Kate D | Microsoft Office | Failure | 7/2/17 | 83.23.95.199 | At risk | Medium | Medium | ⋯ |
| ☐ Mandy M | Office 365 | Success | 7/1/17 | 234.36.12.9 | At risk | Low | Low | ⋯ |
| ☐ Gail S | Office 365 Exch.. | Success | 7/1/17 | 64.95.23.65 | At risk | Medium | Medium | ⋯ |
| ☐ Michael L | Office 365 Exch.. | Success | 7/1/17 | 221.23.54.221 | At risk | Medium | Medium | ⋯ |

⋯

Details

⚠ Confirm compromised  ⊙ Confirm safe  ← 310

Sign-in info  Risk info (Identity Protection 2.0)  Device info  Conditional Access  MFA

| RISK EVENT | | RISK EVENT STATE | TIME DETECTED | TYPE | |
|---|---|---|---|---|---|
| Impossible sign-ins from atypical locations | | Confirmed safe | 7/2/17, 11:22 AM | Offline | |
| First IP address | 128.95.198.1 | First time | 7/2/17, 11:08 AM | | Risk event level |
| Second IP address | 234.12.45.46 | Second time | 7/2/17, 11:22 AM | | Risk event detail |
| First location | Tokyo, Japan | Time difference | 00:14 | | |
| Second location | Mexico City, Mexico | Client | Windows 10; Chrome 59.0 | | |
| Sign-ins from unfamiliar locations | | Confirmed safe | 7/2/17, 11:21 AM | Realtime | |
| Sign-ins from anonymous IP adress | | Confirmed safe | 7/2/17, 11:20 AM | Realtime | |

← 320

Search

Filter Tools

Risky users

Risky sign-ins

Other

SUPERVISED LEARNING SYSTEM FOR IDENTITY COMPROMISE RISK COMPUTATION

CROSS-REFERENCE TO RELATED APPLICATIONS

This application is a continuation of U.S. patent application Ser. No. 16/165,255 filed on Oct. 19, 2018, entitled "SUPERVISED LEARNING SYSTEM FOR IDENTITY COMPROMISE RISK COMPUTATION," which claims the benefit of and priority to U.S. Provisional Patent Application Ser. No. 62/732,470 filed on Sep. 17, 2018 and entitled "SUPERVISED LEARNING SYSTEM FOR IDENTITY COMPROMISE RISK COMPUTATION," which applications are expressly incorporated herein by reference in their entirety.

BACKGROUND

Computing systems and corresponding software applications have become very sophisticated, enabling users to access, manipulate and store data in a variety of formats and to perform numerous functions with that data. For instance, some software applications are configured to perform word processing, design, audio/visual processing, data analysis, email processing, and so forth.

In many cases, software applications are configured to restrict user rights based on permissions and policies associated with their computer resources. This is particularly true for many distributed enterprise systems and applications that enable subscribed users to remotely access their data and services through a web browser or cloud portal. For example, in some instances, users can log into a cloud portal and access computing resources, such as virtual machines or other resources that are remotely hosted, by providing credentials that correspond with an authorized user account.

The use of login credentials for authenticating and validating authorized users is a well-known technique for controlling access to computing resources. However, this type of security procedure can be circumvented by unauthorized and sophisticated intruders that spoof or otherwise obtain valid login credentials. In some instances, cyberattacks, such as brute force attacks, denial of service attacks, spyware, viruses and other malware can also be used to circumvent security measures and policy restrictions placed on computing resources and/or can be used to compromise or harm those computing resources.

To help mitigate against the proliferation of unauthorized use and risky behaviors, some enterprises associate user risk profiles with user accounts to further control/restrict user access to their computer resources. In particular, some systems correlate known users and their login credentials, as well as other profile data, with different risk levels and corresponding security policies to control the access that is provided by the requested computing resources. In such instances, users having high risk profiles are associated with reduced privileges and access rights relative to users having low or lower risk profiles. If a user is later discovered to be high risk, their profile can be updated to reflect their heightened risk level and to restrict their access. However, when these types of systems can still be circumvented, such as when a bad entity creates or uses an account with a lower level risk and/or performs a bad act before the corresponding user risk profile can be updated to reflect the risky behavior.

The foregoing problem is exasperated for systems that manage high volumes of user accounts among many distributed systems. For instance, systems managing hundreds of thousands of user accounts or even millions of user accounts are not able to track and correlate new user accounts with detected bad user accounts in an effective and timely manner, even though they have access to historical data reflecting repeated actions of the bad actors utilizing one or more accounts.

Likewise, systems that manage only a small set of user accounts can also suffer from related problems by failing to have sufficient historical data identifying bad actors, or only limited historical data, which can also effectively prevent such systems from being able to update their risk profiles. particularly before bad actors have launched any attack on a system for the first time, even though those bad actors may have been known to have launched previous attacks against other systems.

Unfortunately, the precision of a security system, which indicates how accurately the system is able to accurately identify a bad actor/actions as being bad, is inversely correlated with the recall effectiveness of the security system, which indicates the total percentage of bad actors/actions that are identified and prevented from harming a system. For instance, a system that identifies all entities as bad actors and prevents all access has a 100% recall effectiveness, but very poor precision (since it will identify even the good actors as being bad). Likewise, a system that is 100% precise, which only identifies only the most obvious bad actors is likely to have a very low recall effectiveness, because it will refrain from identifying the bad actors that are difficult to detect. One reason for this inverse correlation is that existing systems are unable to dynamically and pragmatically process all of the user behavior data and sign-in data that is available in an efficient and comprehensive manner.

In view of the foregoing, there is an ongoing need to improve computer security systems and, particularly, the manner in which computer systems are able to control access to their restricted computer resources and, even more particularly, to the manner in which computer security systems that utilize risk profiles are able to effectively manage and update the risk profiles for enhancing computer security and control access to restricted computer resources.

Despite the foregoing description, it will be appreciated that the subject matter of the disclosed embodiments is not limited to only embodiments that solve the particular disadvantages, or that operate only in environments such as those described above. Rather, this background is only provided to illustrate one exemplary technology area where some embodiments described herein may be practiced.

BRIEF SUMMARY

Disclosed embodiments are directed to systems and methods for improving user identity protection and for further improving computer security systems that are based on user risk profiles and, even more particularly, to embodiments for improving the accuracy and usability of the user risk scores by applying multiple tiers of machine learning to the user risk profile components in order to dynamically generate and modify the corresponding user risk scores.

Some of the disclosed embodiments are specifically directed to methods and corresponding computer systems that implement the methods for improving the precision and recall utility of user risk scores by performing a plurality of acts associated with the application of multiple machine learning tiers to risk profile components to generate and/or modify user risk scores. These user risk scores, which are also referred to herein as user identity risk scores, are used to control the access to computer resources.

In some instances, the methods are implemented by the computer system first accessing stored sign-in data for each sign-in event in a set of sign-in events associated with to a corresponding user. This sign-in data, which is stored for a predetermined period of time, comprising one or more sign-in event. Then, from the stored sign-in data, and based on risk profiles associated with the stored sign-in data, the computer system identifies a set of one or more sign-in detectors for each sign-in event. These sign-in detectors comprise risk features and attributes associated with the sign-in event.

Then, the computer system generates a quantified risk level set of the sign-in detectors by applying a first machine learning tool (which may comprise any combination of one or more system(s) and/or one or more algorithm(s)) to the set of sign-in detectors and in such a way as to quantify the relative risk level associated with each sign-in detector. Next, the computer system generates a quantified risk level set of sign-ins by applying a second machine learning tool to the quantified risk level set of sign-in detectors to quantify a relative risk level associated with each sign-in event in the set of sign-in events.

Once sign-in events are quantified, the computer system generates a user identity risk score that quantifies the overall risk level of the user by applying a third machine learning tool (which may comprise any combination of one or more system(s) and/or one or more algorithm(s)) to the quantified risk level set of sign-ins.

Thereafter, the computer system iteratively and dynamically updates the first user identity risk score or generates a new user identity risk score by reapplying the third machine learning tool to the quantified risk level set of sign-ins. This process may also include the reapplication of the first or second machine learning tools and/or the modification of any of the various quantified risk level settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates one embodiment of a user interface that is incorporated within or utilized by the disclosed embodiments for improving user identity protection and corresponding computing system security that is based on risk profiles;

FIG. 4 illustrates one embodiment of a user interface that is incorporated within or utilized by the disclosed embodiments for improving user identity protection and corresponding computing system security that is based on risk profiles;

DETAILED DESCRIPTION

As indicated above, the disclosed embodiments relate to systems and methods for improving user identity protection and corresponding computer security systems that are based on user risk profiles and, even more particularly, to embodiments for improving the accuracy and usability of the user identities/user risk scores by applying multiple tiers of machine learning to the user risk profile components in order to dynamically generate and modify the corresponding user risk scores.

In some instances, the disclosed embodiments can be utilized to simultaneously improve both the overall precision and recall effectiveness of computer security systems that are based on the use of user risk scores. This is accomplished, in some instances, by iteratively applying multiple machine learning tiers to stored user/sign-in data to generate and/or modify the user identity risk scores.

In some instances, it is possible to utilize the disclosed embodiments to dynamically respond to detected user/sign-in data for a first user and to reach back in time to reapply/re-evaluate the impact of previously stored user/sign-in data for that first user and to generate and/or modify a user identity risk score for that user, as well as to trigger the generation and/or modification of a different user identity risk score for a different user. In some embodiments, a result of generating/modifying a first user's risk score will dynamically affect the generation and/or modification of a different user's risk score, and independent of any new user/sign-in data being received for the different user subsequent to a previous risk score having been created for that different user.

It will be appreciated from an understanding of this disclosure, that the disclosed embodiments can significantly improve the responsiveness, accuracy and effectiveness of computer system security, and even more particularly the utility and precision and recall effectiveness of user identity risk scores by computer systems for implementing security based on the identity risk scores. For instance, by way of example, the current embodiments can be used to update user risk scores dynamically based on the actions detected for other users and which can be used to more dynamically restrict rights of a bad actor before that bad actor can launch a first attack against a particular system and/or to provide more proactive remediation of risk (e.g., credential resets, expiry or demotion, etc.).

Figure 1:
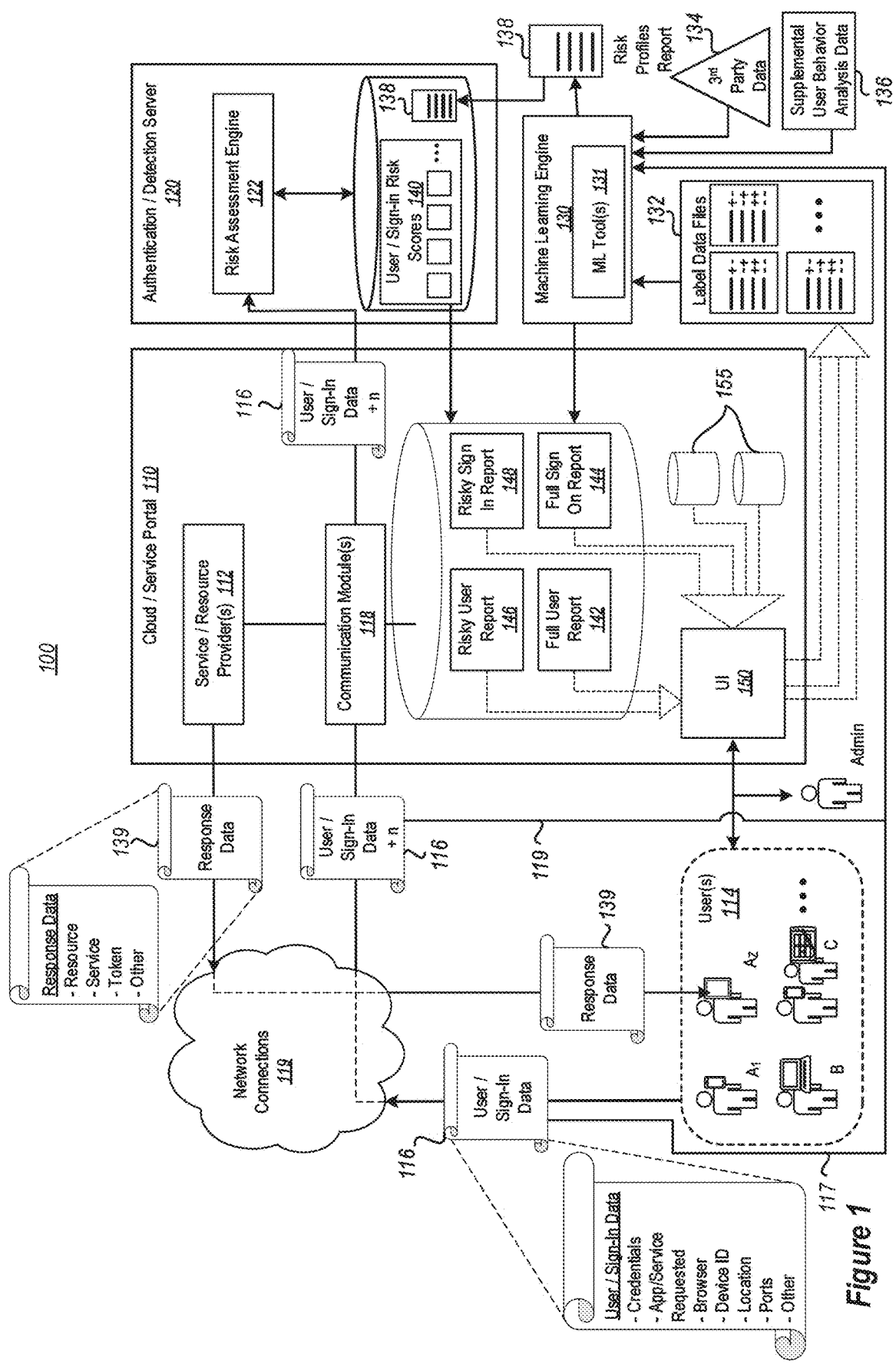
FIG. 1 illustrates a computing environment of a computing system comprising a cloud service that combines multiple computer systems and that is incorporated within or utilized by the disclosed embodiments for improving user identity protection and corresponding computing system security that is based on risk profiles.
Figure 2:
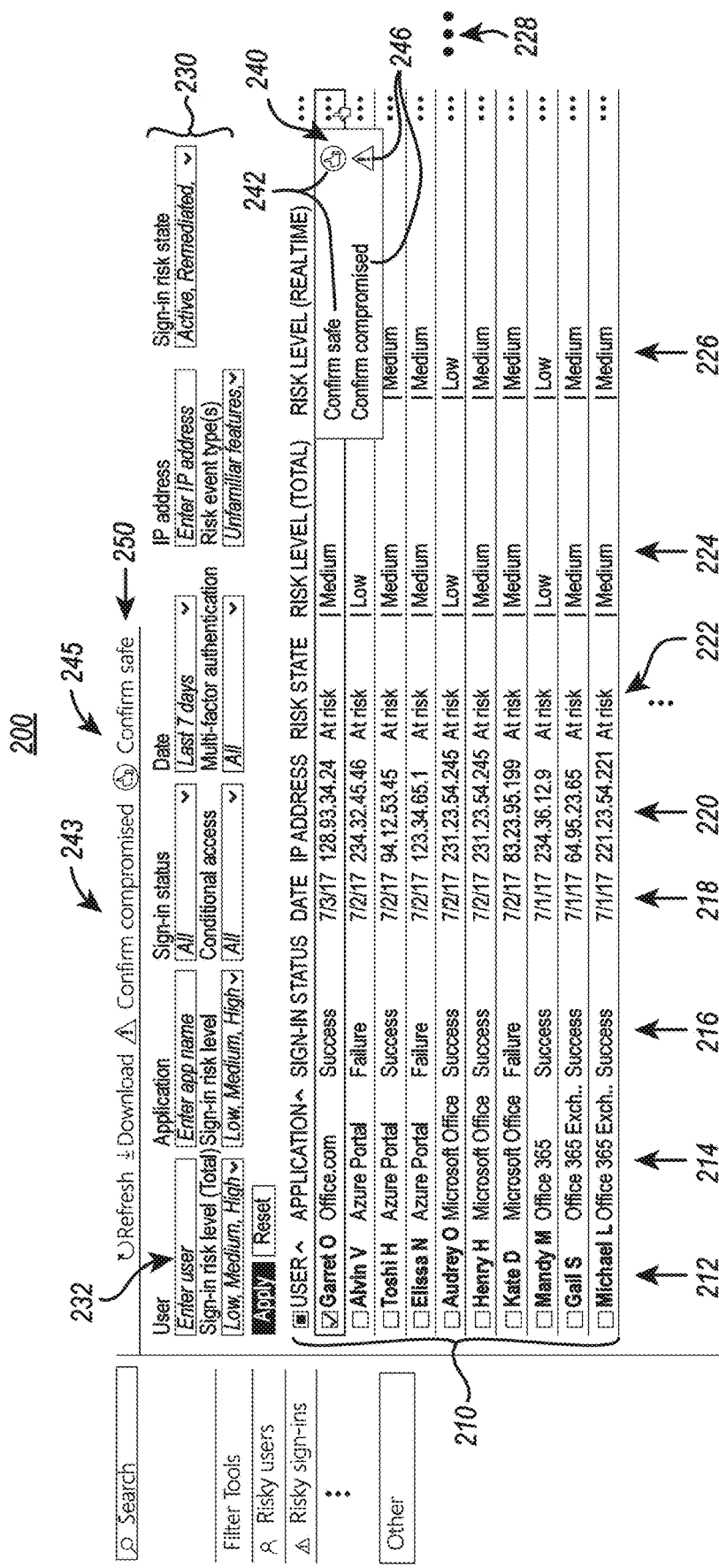
FIG. 2 illustrates one embodiment of a user interface that is incorporated within or utilized by the disclosed embodiments for improving user identity protection and corresponding computing system security that is based on risk profiles.
Figure 4:
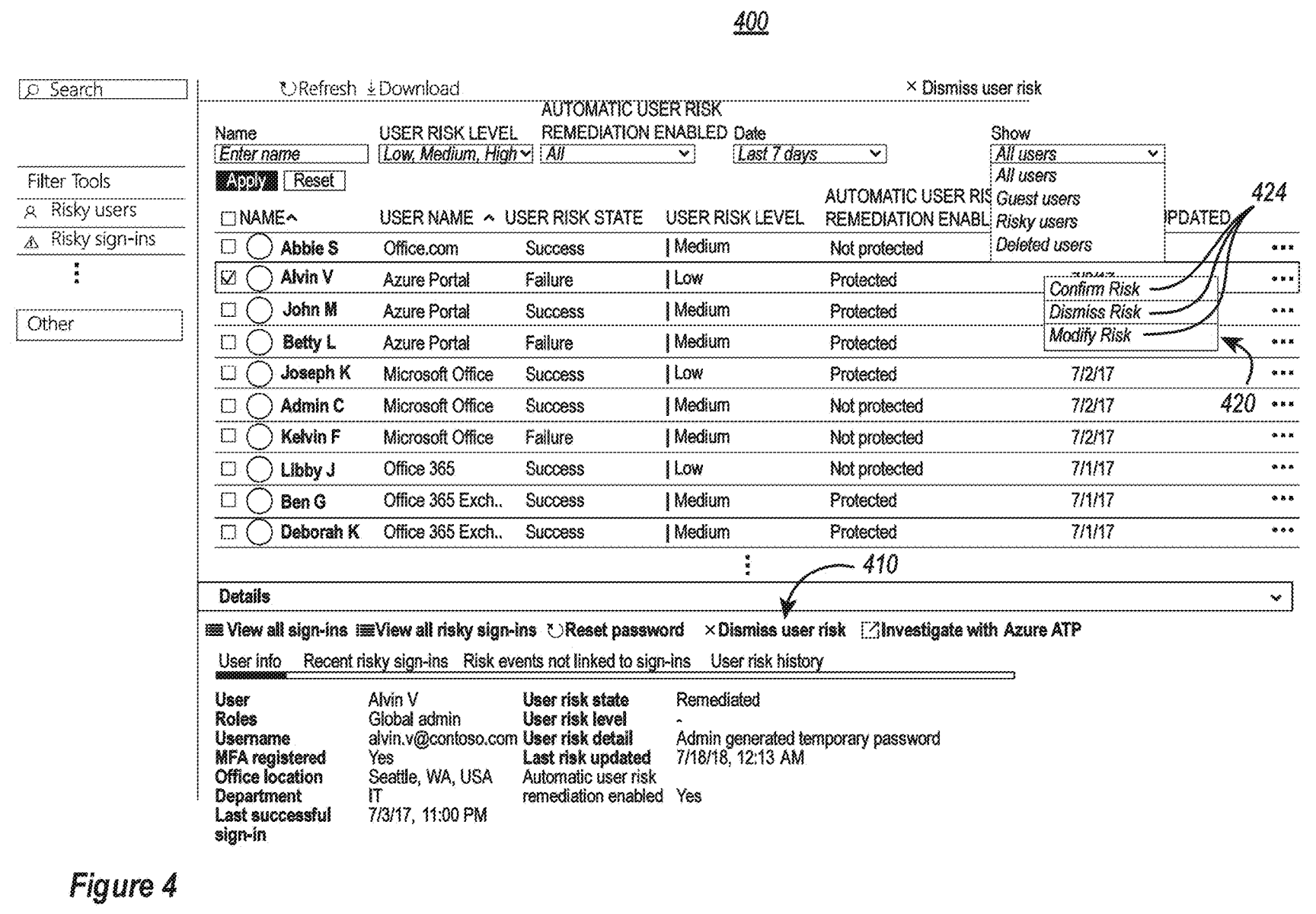
Figure 5:
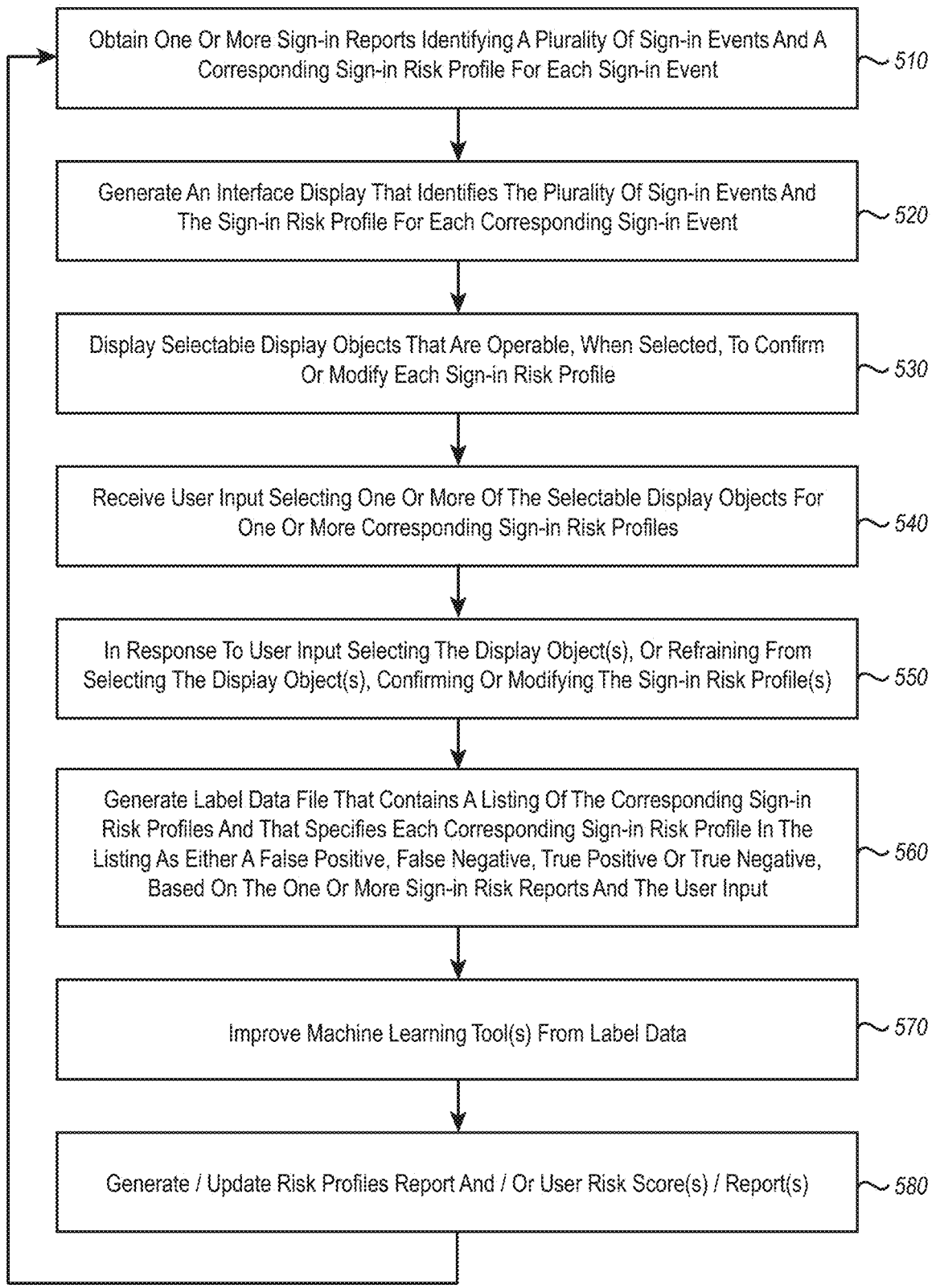
FIG. 5 illustrates a flowchart of acts associated with disclosed methods and embodiments for improving user identity protection and corresponding computer system security associated with sign-in risk profiles.
Figure 6:
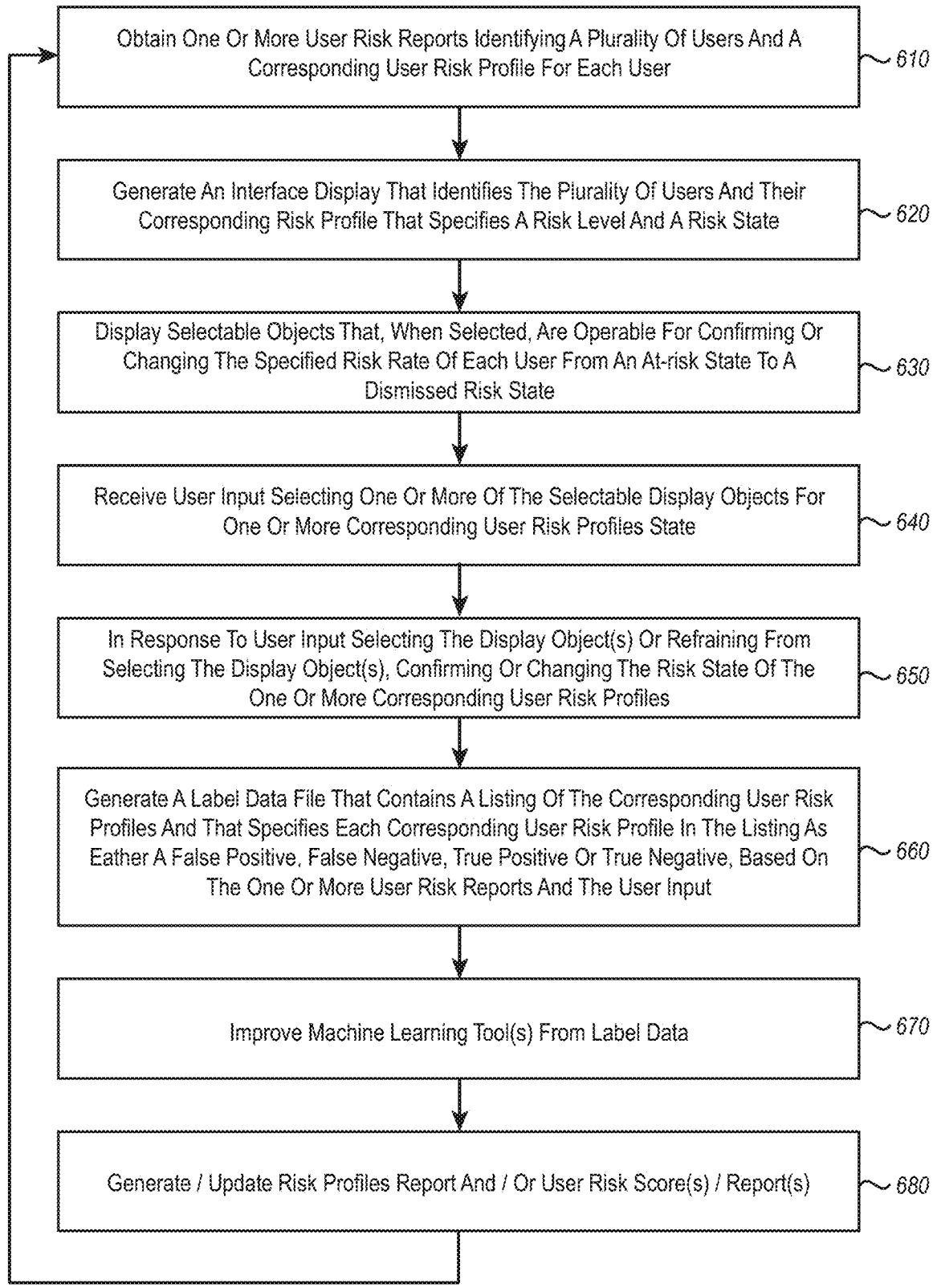
FIG. 6 illustrates a flowchart of acts associated with disclosed methods and embodiments for improving user identity protection and corresponding computer system security associated with user risk profiles.
Figure 7:
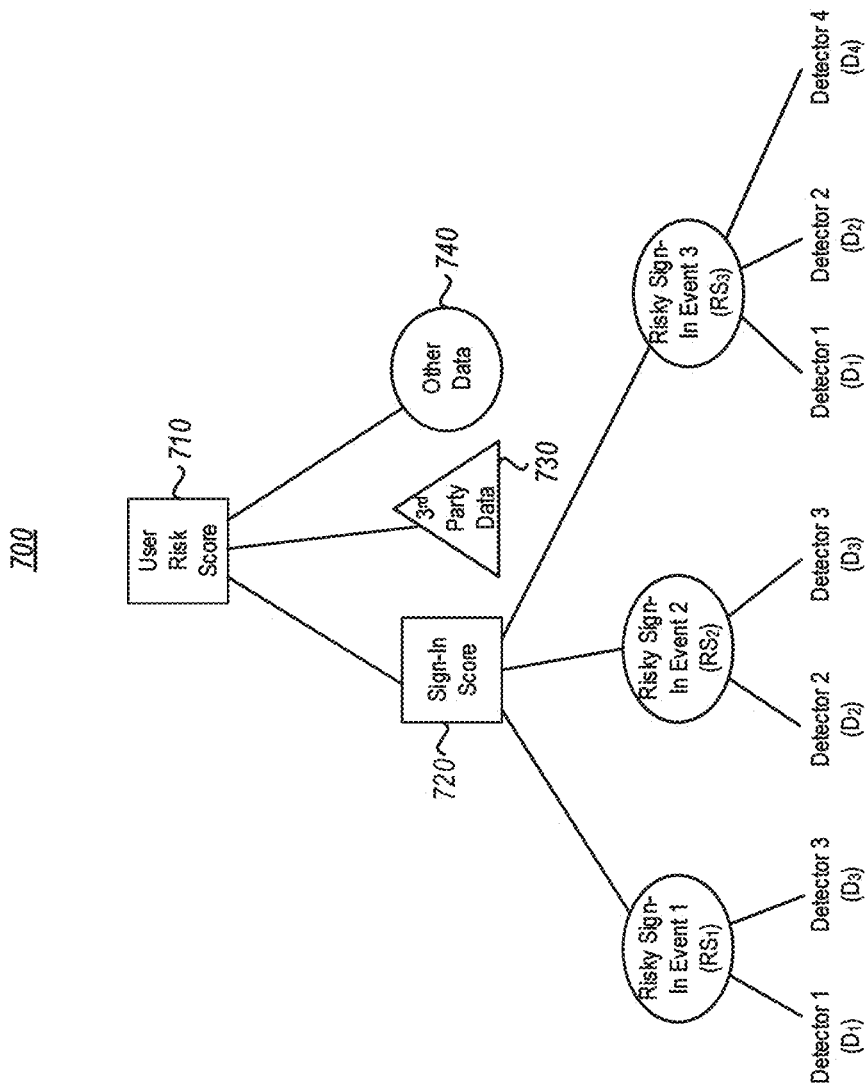
FIG. 7 illustrates a non-limiting representation of components that are associated with generating a user risk score.
Figure 8:
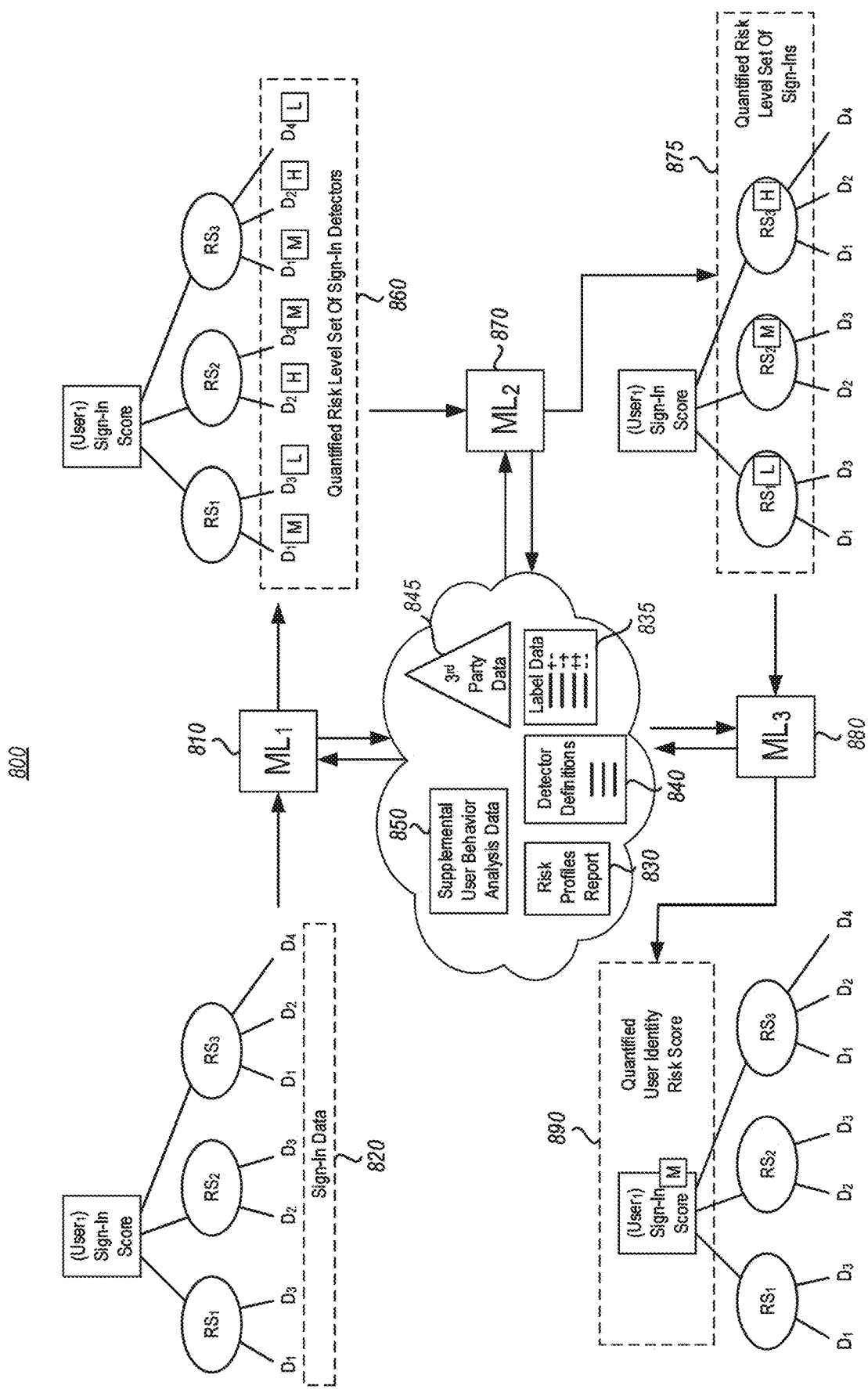
FIG. 8 illustrates a representation of user risk score components and machine learning components that are used to generate and/or modify a user's risk scores.
Figure 9:
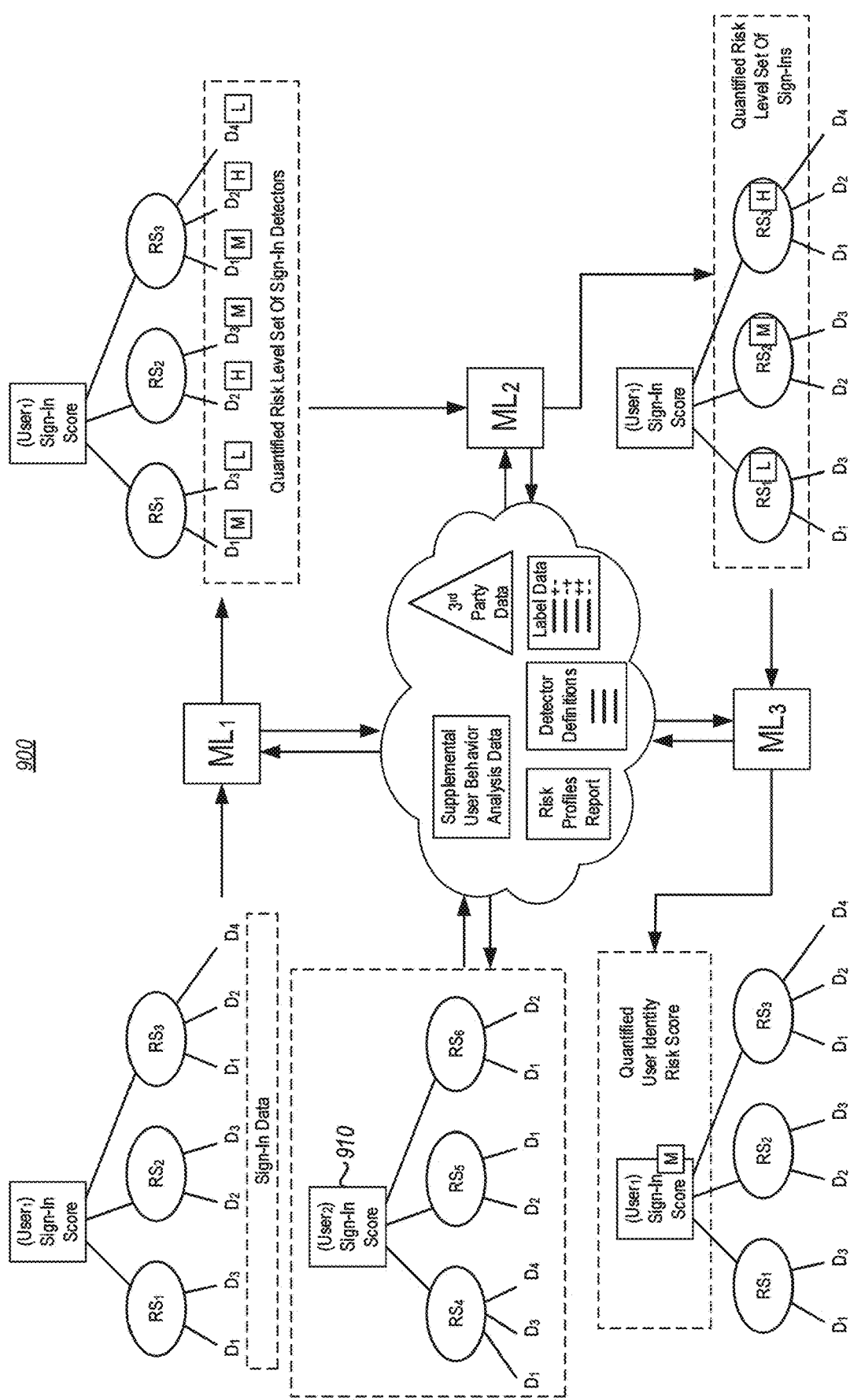
FIG. 9 illustrates a representation of user risk score components and machine learning components that are used to generate and/or modify different users' risk scores.
Figure 10:
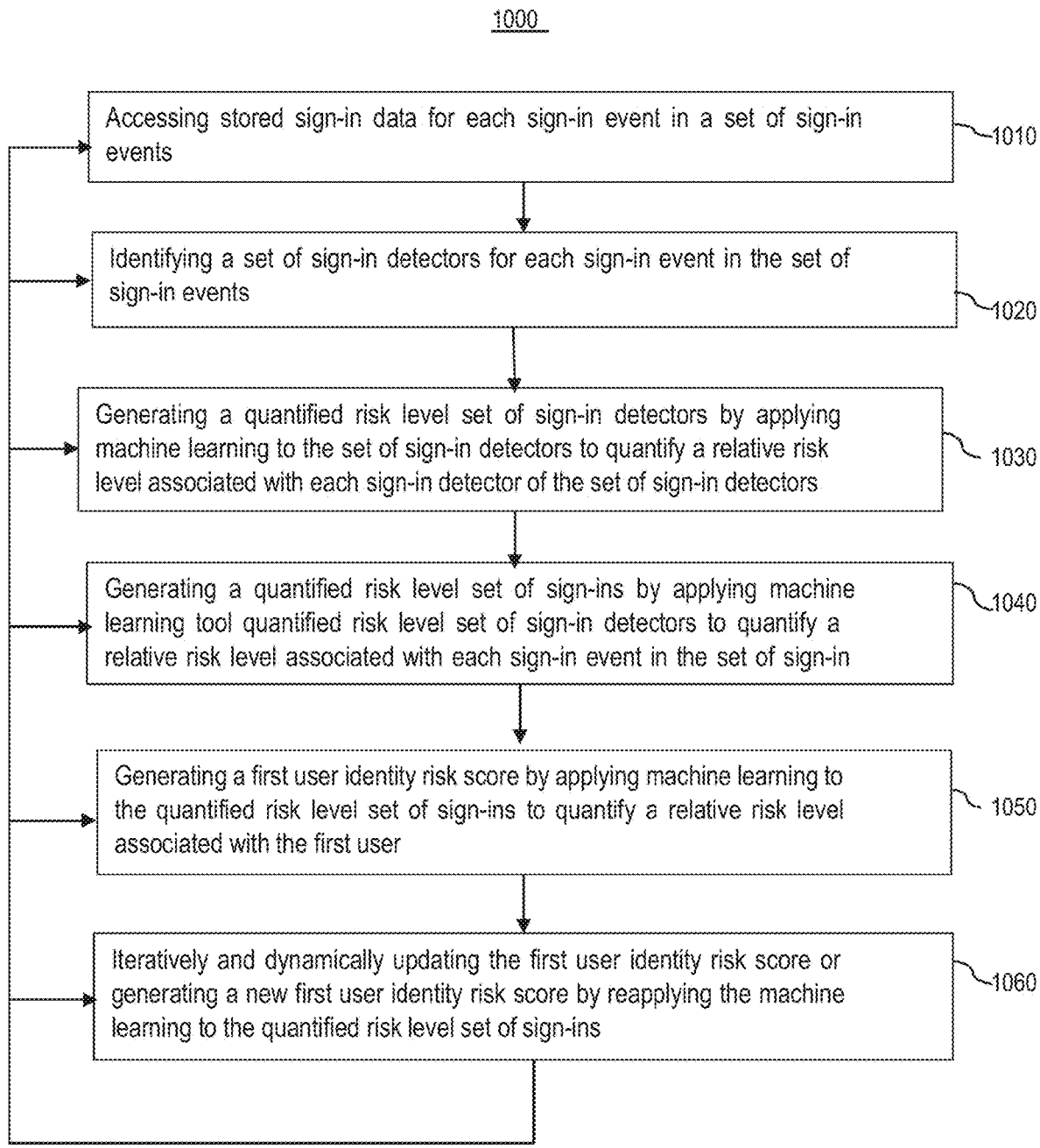
FIG. 10 illustrates a flowchart of acts associated with disclosed methods and embodiments for improving computer system security associated with user risk profiles.

Attention will now be directed to the figures, which illustrate various aspects of the disclosed embodiments. For instance, FIG. 1 illustrates an embodiment of a computer system 100 that may include or be used to implement the disclosed and claimed functionality of the invention. FIGS. 2-4 illustrate various embodiments of user interface elements that can be used to display and validate or change user risk profiles and sign-in profiles. FIGS. 5-6 illustrate various flowcharts and acts associated with improving security of computer systems that utilize sign-in risk profiles (FIG. 5) and user risk profiles (FIG. 6). FIGS. 7-9 illustrate representations of user identity risk score components and machine learning components that are used to generate and/or modify the user identity risk scores. And, FIG. 10 illustrates a flowchart of acts associated with disclosed methods and embodiments for improving computer system security associated with user identity risk scores.

It will be appreciated that the term user risk score is sometimes used interchangeably herein with the terms user risk score, identity score, identity risk score, user identity score, user identity risk score, risk profile and user risk profile. The term sign-in score can also be viewed as interchangeable with the user identity risk score or may comprise only a subcomponent of the user identity risk score. It will also be appreciated that the user identity risk score may be represented as a numeric value, a label, or any other representation that enables the user identity risk score to quantify or otherwise reflect a relative measure or level of risk, as compared to different user identity risk scores. For instance, the risk scores can be reflected according to a quantified risk of high, medium, low, or no risk. Likewise, the risk scores can be quantified and reflected as a number within a numeric range (e.g., a range of 0-1, 0-4, 0-100, or another range). Likewise, the risk scores can be quantified on a binary set of risk, no risk levels. Accordingly, the disclosure presented herein should not be interpreted as being restrictive to the types of risk levels or magnitudes that are used to quantify a level of risk associated with the disclosed user identity risk scores.

As shown in FIG. 1, the computer system 100 comprises a cloud service that includes multiple different computers, such as a cloud/service portal 110 that provides users access to one or more computer resources from one or more service/resource provider(s) 112 that are included within the cloud/service portal 110 or that are remotely located and/or distributed from the cloud/service portal 110. As mentioned above, the disclosed cloud/service portal 100 is a distributed system, in some instances, combining multiple different computer systems.

The users 114, which may comprise any combination of one or more entities and devices and device types, access the cloud/service portal 110 through one or more network connections 119. In some instances, the users comprise individual people having separate user accounts that correspond to a single device or, in some instances, to multiple devices. In other instances, the users comprise a group of people that share a common user account. The users 114 can be individuals or tenant organizations. Each user has a corresponding user identity that is associated with their account and that is, in some instances, mapped to a user risk score maintained by or accessible by the cloud/service portal 110 and/or linked systems. Each user identity has a corresponding user risk score.

In some instances, the users 114 are only able to access requested services/resources upon being authenticated and validated for the requested services/resources and, in some instances, upon a determination being made that the user account has a user risk score that is below a certain risk threshold and/or by determining that a sign-in risk score associated with a user request/sign-in is below a certain risk threshold (as will be described in more detail below).

The authentication and validation of a user account and their access rights may be performed, in some instances, by the user providing a required combination of credentials, which may include any combination of user login credentials (e.g., name and password), certificates, digital signatures, device identifiers, tokens and so forth. In some instances, no credentials are required.

At any time before, during or after the user makes the specific request for desired services/resources, the user may be required to provide the user/sign-in data 116, which may comprise any combination of the aforementioned identity credentials, as well as other user/sign-in profile data, such as the application or service that is being requested, an identification of the browser or application that is being used by the user, the identifier(s) of the user device(s), the location of the user and/or other device profile data (e.g., the ports being used, IP identifiers, and so forth), user biometrics, two factor authentication data, a time of day, time since a last request, etc. This user/sign-in information may be explicitly asked of a user, such as through a user interface display. Alternatively, or additionally, the user/sign-in data 116 may be obtained without the user's knowledge, such as by the cloud/service portal 110 sending query packets to the user device and/or by examining the metadata in the message packets that are received from the user and without displaying a request to the user and/or by the cloud/service portal detecting conditions/behaviors associated with the user and sign-in events and/or by receiving any of this user/sign-in data from a third party.

The user/sign-in data 116, which may be supplemented with additional +n identifiers that further identify attributes or patterns of the network connections (e.g., routing information, quantity of connections, transmission and transport protocols, etc.) is received by the communication module(s) 118 of the cloud/service portal 110 and passed to an authentication/detection server 120 that utilizes a risk assessment engine 122 to identify and evaluate the user risk profile and/or sign-in risk profile associated with the user request for services/resources. The sign-in data 116 may also be directly sent to the machine learning engine 130, for analysis and application by the machine learning engine 130 (which itself may be a part of the cloud/service portal 110). This is shown, for example, by lines 117 and 119.

The user/sign-in data is also stored in one or more storage devices of the cloud/service portal. In some instances, the user/sign-in data is stored for a predetermined period of time before it is aged out, such as one or more days, weeks or months. In some instances, different types of sign-in data are stored for different periods of time. In yet other instances, the sign-in data is stored in a ring buffer that stored a predetermined quantity of data for a user before it is replaced.

Regardless of where the sign-in data is stored or how it is obtained, and regardless of the format the sign-in data is presented in, it is provided to the machine learning engine 130 and corresponding machine learning tool(s) 131 (which will be described in more detail below and which may comprise any combination of one or more system(s) and/or one or more algorithm(s)) to further improve the machine learning tool(s) 131 of the machine learning engine 130, by refining/training the machine learning tool(s) 131, as described herein. Likewise, the label data files 132 (which will be described in more detail below) and other 3rd party data 134 and supplemental user behavior analysis data 136 can also be used to further train and improve the machine learning tool(s) 131.

The machine learning tool(s) 131 comprise one or more system(s), module(s) and/or algorithm(s) for analyzing and determining user/sign-in risk scores and other risk profiles. The machine learning tool(s) 131 may comprise or use, for example, multilayer neural networks, recursive neural networks, or deep neural networks that are trained with the user/sign-in data 116, label data files 132, 3rd party data 134 and/or supplemental user behavior analysis data 136.

In some embodiments, the machine learning engine 130 and tool(s) 131 include or use ensemble or decision tree models, such as decision trees, random forests or gradient boosted trees that are trained with the user/sign-in data 116, label data files 132, 3rd party data 134 and/or supplemental user behavior analysis data 136.

In some embodiments, the machine learning engine 130 and the machine learning tool(s) 131 include or use linear models such as linear regression, logistic regression, SVMs (support vector machines), etc., which are trained with the user/sign-in data 116, label data files 132, 3rd party data 134 and/or supplemental user behavior analysis data 136.

The machine learning engine 130 and the machine learning tool(s) 131 may utilize any of the foregoing machine learning models and techniques.

It will be appreciated that the machine learning engine 130 may comprise a part of the cloud/service portal 100, as a service for example, even though it is shown outside of the box associated with the cloud/service portal 100. Likewise, the risk assessment engine 122 and the authentication/detection server 120 may also be a part of the cloud/service portal 110 or a remote and/or third-party system in communication with the cloud/service portal 110.

The risk assessment engine 122 evaluates the various user/sign-in data 116 to identify the user and to further identify patterns associated with the sign-in and account of the user. For instance, the authentication/detection server or cloud/service portal 110 is able to use the user/sign in data to detect whether the sign-in event is associated with a suspicious device, a new device, an atypical or typical location, an anonymous IP address, a familiar or unfamiliar IP address, with known to be leaked credentials, from a device infected with malware, from a location that is distant from a known location of a user, or other sign-in attribute.

These and/or other factors are compared by the risk assessment engine 122 to identify attributes/patterns in a risk profiles report 138 to determine an appropriate user risk score and/or sign-in event risk score (140) to associated with the corresponding user and/or sign-in event(s). This may require the generating of a new score or modifying existing scores 140, by the risk assessment engine 122, in real-time (dynamically based on detecting new user/sign-in data as it is received), or on demand, and by comparing the detected user/sign-in data 116 to the profiles/telemetry in the risk profiles report 138.

Once the risk score 140 is generated or modified, based on the new user/sign-in data 116, that risk score 140 can be provided to and/or used by any of the computer components (e.g., service/resource provider(s), communication module (s), or other components/systems) to control and restrict access to the requested services/resources based on the risk policies of the various systems, services and resources. If the risk score is too high, the user may be prevented from accessing requested resources or may be used to trigger any combination of proactive remediation steps, such as, but not limited to initiating a request for the user to perform additional authentication/verification by providing additional user/sign-in data. The risk score can also be used to trigger the expiry or demotion of access rights/privileges of a user account. In some instances, alternatively, the risk score is used to increase access rights, such as when the risk score is lowered as a result of the analysis by the risk assessment engine 122 and machine learning engine 130.

In some instances, the risk scores are provided to third parties (not shown), which are connected through the network connections to the cloud/service portal).

It will also be appreciated that the user risk scores and the sign-in risk scores may be used in combination or independently of one another to control access to the requested services/resources.

When a user is authorized to access the requested services/resources, based on the user risk score and/or sign-in risk score falling below a predetermined threshold, the cloud/service portal or service/resource provider(s) provide response data 139 to the user which contains the requested resource/service or at least a token or pointer for accessing the requested service/resource.

The foregoing process is even further improved by providing crowdsourced feedback loops for further refining and tuning the risk profiles in the risk profiles report with machine learning applied to label data that is generated by the crowdsourced feedback.

The crowdsourced feedback is provided, in some instances, based on explicit input received at interfaces that are used to display risky user reports and risky sign-in reports, as well as full user reports and full user sign-in reports.

As different user accounts are monitored, and their risk scores 140 are created and modified, these user accounts are tracked in a full user report 142. Likewise, the sign-in attempts (which may comprise any sign-in event, whether successful or not), may be monitored and logged in a full sign-in report 144 (also called a full sign on report). These full user and sign-in reports (142/144) can also be parsed and filtered to generate corresponding risky user reports (146) and risky sign-in reports (148) that only contain users and sign-in events that are determined to meet or exceed a predetermined certain risk threshold. Different risk thresholds and categorization schemes may also be used to accommodate different needs and preferences. For instance, the risk categorization scheme may label or value the different user risk profiles and sign-in risk profiles according to a high, medium, low scheme, a numerical range scheme, a binary risky/not risky scheme, or any other scheme.

The various risk reports (146/148) are presented to an administrator (or sometimes the user) to validate, change or refute/dismiss the particular risk label or value, via one or more UI (user interface) 150, thereby generating label data comprising indicators of false positives, true positives, false negatives and true negatives for the different user accounts and sign-in events. This label data is used as crowdsourcing feedback by one or more machine learning models/algorithms to further train the machine learning and to generate a new or updated risk profiles report that maps the various user patterns and sign-in patterns to different risk valuations.

As described below, with reference to FIGS. 7-10, this machine learning engine may apply a tiered approach generate/modify risk scores by quantifying the relative risks associated with a user and/or sign-in event based on the crowdsourcing feedback and/or other third-party data and/or other supplemental user behavior analysis data (e.g., two factor authentication data. requested user feedback to challenge questions, subsequent actions or lack of actions from a user, etc.). The machine learning engine may be an independent system, remotely located from the cloud/service portal and/or authentication/detection server, or an integrated component of the cloud/service portal and/or authentication/detection server.

With specific regard to the feedback label data, it will be appreciated that when a particular user/sign-in data element is labeled with a risky label/value and user input is subsequently received to indicate that the label is wrong (by challenging, changing or dismissing the risk label/value), a false positive indicator is generated and associated with that user/event in the label data contained in the one or more corresponding label data files (132). When fed into the machine learning engine, this will decrease the likelihood that similar user/event patterns will generate a risk level of the same magnitude as before for the same user/sign-in events, as well as for other users/sign-in events having the same or similar user/sign-in data.

Likewise, when the user input confirms or leaves the risky label unchanged/unchallenged, by selecting an option to validate the current label and/or by refraining to provide any input, a true positive indicator is generated and associated with that user/event in the label data. When fed into the machine learning engine, this will increase the likelihood that similar user/sign-in event patterns will generate a risk level of the same magnitude as before for the same user/sign-in events, as well as for other users/sign-in events having the same or similar user/sign-in data.

When a particular user or sign-in event is labeled with a non-risky label and user input is received to indicate that the label is wrong (by challenging, changing or adding a heightened risk label), a false negative indicator is generated and associated with that user/event in the label data. When fed into the machine learning engine, this will increase the likelihood that similar user/event patterns will generate a risk level of a greater magnitude as before for the same user/sign-in events, as well as for other users/sign-in events having the same or similar user/sign-in data.

Likewise, when the user input confirms or leaves the non-risky label unchanged/unchallenged, by selecting an option to validate the current label and/or by refraining from providing input, a true negative indicator is generated and associated with that user/event in the label data. When fed into the machine learning engine, this will increase the likelihood that similar user/sign-in event patterns will generate a similarly low or lower risk level as before for the same user/sign-in events, as well as for other users/sign-in events having the same or similar user/sign-in data.

As reflected by the additional storage containers 155, the various reports (i.e., risky user report, risky sign-in report, full user report, full sign-in report) may be contained in a single storage location (stored as one or more files). Alternatively, one or more of these reports may be distributed among a plurality of different storage containers and files. Likewise, different reports may be generated for different users and groups of users, including different reports for different enterprises or different subsets of users in the same or different enterprises.

As shown in FIG. 2, a risky sign-in report interface 200 includes a listing of a plurality of different sign-in events 210, along with the corresponding telemetry/pattern data that associated with those events, including the user 212 associated with the sign-in event, an application 214 being used or requested with the sign-in, the success/failure state 216 of the sign-in event, the date 218 of the sign-in event, the IP address 220 of the device requesting the sign-in or the IP address of the host receiving the sign-in request, a sign-in risk state 222 (currently they all show 'at risk'), a sign-in risk level 224 corresponding to a recorded risk score (e.g., High, Medium or Low), a dynamic and real-time risk level 226 corresponding to a modified risk score based on new machine learning that is being applied in real-time. Various other telemetry data may also be provided, although not explicitly shown at this times, a reflected by ellipses 228. This additional telemetry data may include, but is not limited to, a status indicator of conditional access (indicating whether additional control restrictions were required and or applied), and whether multi-factor authentication was applied or not, and whether additional user behavior (e.g., multi-factor authentication) was successful or not.

In this regard, it will be appreciated that the various user interfaces shown and described in FIG. 2-4 may include various other fields of telemetry can be displayed, or less fields of telemetry can be displayed, corresponding to any of the detected user/sign-in data for the different users and sign-in events, to accommodate different needs and preferences. Likewise, various filtering tools, like the presented pulldown menus 230 can be used to filter the selection of users and sign-in events that are presented and their ordering/presentation format.

When a sign-in event is selected, a risk confirmation/challenge object 240 is displayed, which presents selectable display objects that are operable, when selected, to confirm a safe risk state (242) or to confirm a compromised state (246) of the corresponding sign-in event. Other displayed objects can also be used to enable a user to select the object(s) to confirm and/or change a risk state of a sign-in event, such as in response to selecting a pull-down menu 230 or entering data in an input field 232 that identifies a user. Then, depending on the user input received, and/or not received, for each sign-in event, a corresponding identifier of label data (e.g., false positive, false negative, true positive, false positive) can be generated for that sign-in event. This label data can be compiled into a label data file that contains label data for a plurality of sign-in events.

It will be appreciated that the label data can be sent in real-time to the Machine Learning Engine, automatically and dynamically in response to detected user input, or in batches at predetermined periods and/or periodically on demand.

In some instances, a group of different events can be selected (e.g., by selecting radio dial objects, check boxes, etc.) and or by selecting a plurality of events for a single user or multiple users via the pull-down options 230 and/or input field(s) 232. Whether a single event is selected (as shown), or a plurality of different event(s) are selected (not shown), that single event and/or group of selected events can be individually and/or collectively confirmed safe or confirmed compromised by providing selection user input directed at one of the displayed selectable objects 210 that are presented when the single event/group of events is selected. Likewise, other selectable objects 243/245 at different locations on the interface, which may be persistently displayed as part of a ribbon or menu bar 250 can be selected to provide the user input.

FIG. 3 illustrates another interface 300 embodiment, which provides additional selectable objects 310 for enabling a user to provide user input comprising crowd-sourced feedback that is used to validate, challenge or change the risk label/value associated with a particular sign-in event. This set of selectable display objects 310 is presented within a frame of additional sign-in event telemetry that is provided, in this embodiment, to give additional details about a logged sign-in event for a particular sign-in event that is selected from the primary listing of sign-in events.

FIG. 4 illustrates an embodiment of a risky users report interface 400, wherein a list of users is presented with corresponding user name, state, risk level, timing of last update and other information corresponding to the user and stored user risk profile. The displayed user data may vary to accommodate different needs and preferences and may include more or less than the information shown, including any combination of user data that is detectable and stored for the user, including sign-in data.

In some embodiments, each user listed in the interface 400 can be selected, by hover focus, prompt selection (e.g., check box, radio dial or other displayed selectable control object), or query field selection (not shown), as described above, with regard to the interface 300 of FIG. 3. When a user is selected, a risk confirmation/challenge object 420 may be displayed, which presents selectable display objects 424 that are operable, when selected, to confirm a risk state, dismiss a risk state or to otherwise modify a risk state, respectively, associated with the user. Then, depending on the user input received or not received for each user, a corresponding identifier of label data (e.g., false positive, false negative, true positive, false positive) can be generated for that user, as generally described above. For instance, selecting a confirm risk for the user Alvin will result in generating a true positive indicator for that user/risk score. If Alvin had a high-risk level, which was confirmed, this would generate a true negative indicator. In contrast, selecting a dismiss object (if Alvin had a 'high' risk level) would result in generating a false negative indicator. Selecting a modify object may trigger an additional display for selecting an appropriate risk level. Then, depending of if the risk level selected is higher or lower, the system could generate correspondingly false positive or false negative indicator(s), respectively.

It will be appreciated that the label data can be sent in real-time to the Machine Learning Engine, automatically and dynamically in response to detected user input, or in batches at predetermined periods and/or periodically on demand.

In some instances, a group of different users can be selected to confirm, dismiss or change the risk label/level associated with the selected user(s), by providing selection user input directed at one of the displayed selectable objects associated with the risk label/level.

In FIG. 4, a selectable dismiss risk object 410 is presented in response to selecting a particular user or group of users. In the current embodiment, the selectable object is presented with other telemetry data associated with the user risk profile of the selected user. The dismiss risk object 410 may also be used to trigger the generation of a false negative indicator (for a user that previously had a high or medium risk level).

Attention will now be directed to FIGS. 5 and 6, which illustrate various flowcharts (500 and 600) comprising various acts included in or associated with the discloses methods for improving computer security by using crowdsourced feedback loops. It will be appreciated that while the method acts may be discussed in a certain order or illustrated in a flowchart as occurring in a particular order, no particular ordering is required unless specifically stated, or required because an act is dependent on another act being completed prior to the act being performed.

FIG. 5 illustrates a flowchart 500 that is associated with methods that are specifically associated with improving computer system security for computer systems that base their security at least partially on sign-in risk profiles. As shown, these embodiments include a computer system obtaining one or more sign-in reports identifying a plurality of sign-in attempts and a corresponding sign-in risk profile for each sign-in attempt of the plurality of sign-in attempts (act 510).

Then, the computer generates an interface display that identifies the plurality of sign-in attempts and the sign-in risk profile for each corresponding sign-in attempt (act 520), along with selectable display objects that are operable, when selected (or not selected), to confirm or challenge the corresponding user risk profile (act 530). In some instances, this includes labeling the sign-in risk profile as either at risk or safe. Next, user input is received for selecting one or more of the selectable display objects for one or more corresponding sign-in risk profiles (act 540) and the computer system, responsively, confirms or modifies the listed risk profile. This may include, for example, designating the one or more corresponding sign-in risk profiles as either a confirmed safe sign-in risk profile or, alternatively, a confirmed compromised (e.g., at risk or risky) sign-in risk profile (act 550). Other labels and risk values can also be used to reflect relative risk.

Next, the computer system generates a label data file that contains a listing of the corresponding sign-in risk profiles that have been confirmed or modified (e.g., confirmed safe and/or confirmed compromised) and that specifies each corresponding sign-in risk profile in the listing as either a false positive, false negative, true positive or true negative, based on the one or more sign-in risk reports and the user input (act 560). Finally, the machine learning engine is improved/modified by causing the machine learning tools used by the machine learning engine to learn/apply the labeled data in the label data file to the machine learning engine and in such a way that the machine learning is enabled to generate or modify a risk profiles report that is used by a risk assessment engine to generate sign-in risk scores (act 580). These risk scores are then used to generate or update the one or more sign-in risk reports obtained by the computing system for real-time use or subsequent use (act 580).

FIG. 6 illustrates a related embodiment, which may be practiced alone, or in combination with the embodiment shown in FIG. 5.

As shown, FIG. 6 illustrate a flowchart 600 of methods that are specifically related to improving computer security for computer systems that are associated with user risk profiles. The first act includes a computer system obtaining one or more user risk reports identifying a plurality of users and a corresponding user risk profile for each user in the plurality of users (act 610). Next, the computer system generates an interface display that identifies the plurality of users in the one or more user risk reports and their corresponding risk profile that specifies a risk level and a risk state (act 620), along with one or more selectable display objects that, when selected, are operable for changing the specified risk state of each user (act 630). This may include, for example, changing a risk state from an at-risk state to a dismissed risk state or from a no risk state to a risk state.

Then, upon receiving user input selecting one or more of the selectable display objects for one or more corresponding user risk profiles (act 640) and/or in response to receiving no input for confirming an existing risk state, the computing system responsively confirms and/or changes the risk state of the one or more corresponding user risk profiles (act 650). In some instances, the user may refrain from providing any input for changing a risk state, thereby confirming the risk state.

Thereafter, the computing system generates a label data file that contains a listing of the corresponding user risk profiles and that specifies each corresponding user risk profile in the listing as either a false positive, false negative, true positive or true negative, based on the one or more user risk reports and the user input (act 660). The machine learning engine is then improved/modified by causing the machine learning tools utilized by the machine learning engine to learn/apply the labeled data in the label data file to the machine learning engine (act 670) and in such a way that the machine learning engine/tools are enabled to generate or modify a risk profiles report that is used by a risk assessment engine to generate user risk scores (act 680). These user risk scores are then used to generate or update the one or more user risk reports automatically and dynamically in real-time and/or on demand (act 680).

In some embodiments, each of the foregoing processes are performed iteratively and, in some instances, in combination. Also, the user input and user risk profiles are sometimes associated with different organizations, thereby providing enhanced crowdsourced feedback that is used as training data for the machine learning systems to more dynamically and responsively update the user risk profiles and the sign-in risk profiles in a manner that can significantly improve user identification protections, as well as computer system security systems that rely on such risk profiles.

For purposes of illustration of some of the benefits that can be achieved for improving computer security for systems that utilize user and sign-in profiles, a few use examples will be provided.

In one embodiment, for example, the modification of a first user risk profile (based on crowdsourced user input), such as changing a first user risk profile from an at risk state to a dismissed risk state could result in a modification of a second user risk profile in a same or different risk report associated with a different/second user, based on the machine learning applied to the corresponding label data that is generated in response to the user input. This is true, in some embodiments, regardless of whether the users belong to the same organization or different organization, and even when these profile risk scores are used to grant or deny access to one or more organization resources.

In some instances, the granting of resources to a requesting user will also result in the modification of a risk score to that same user or a different user (of a same or different organization).

In some embodiment, user input is received at the user interface of a sign-in risk report causing a first sign-in risk profile to be designated with either a confirmed safe sign-in risk profile or, alternatively, a confirmed compromised sign-in risk profile and this results in the computing system responsively modifying a second sign-in risk profile in the one or more sign-in risk reports that is associated with a second logged sign-in to be a different status or risk level, based on the user input selecting the one or more selectable display objects for the first sign-in risk profile of the first logged sign-in.

In some instances, the foregoing example occurs when the first logged sign-in event and the second logged sign-in event comprise separate logged sign-ins for a same user account. In other instance, the logged sign-in events occur for different user accounts of a same user. In yet other instances, the logged sign-in events comprise separate logged sign-ins for accounts belonging to different users of a same organization or a different organization, wherein the sign-in risk profiles are used by the same or different organizations, respectively, to determine whether to grant or deny the different users access to the organization resources.

In another example, a first sign-in request is received from a first user and a first sign-in profile associated with the first sign-in request is identified based on sign-in profile data included with the first sign-in request and is presented in a sign-in risk profiles report. The user's request is also granted or denied, based on the first sign-in risk score. Then, based on subsequent input from the computing system to confirm or modify the sign-in risk score (such as by presenting the report and selectable options), the user input is received, which confirms or modifies the sign-in risk and causes a new or updated label data file to be generated. Machine learning is applied to the label data file, with or without a previous risk profile report, to generate or update a risk profile report that is subsequently used to create/modify one or more sign-in event records and risk scores and/or user risk profiles.

Attention is now directed to FIG. 7, which illustrates a representation 700 of a user risk score 710 and which may be based on or include a corresponding sign-in score 720, which is further dependent on one or more sign-in events (e.g., risky sign-in events 1-3, or any other quantity of sign-in events) and the corresponding detectors/features of those sign-in events (e.g., detectors 1-4, or any other quantity and/or combination of detectors/features). In this regard it will be appreciated that the detectors used by the system can include any combination and quantity of detectors (e.g., tens, hundreds, thousands or even more detectors). The detectors may also comprise any combination of hardware and software sensors.

It will be noted that the various detectors comprise a defined set of features or attributes that are detectable and/or detected for a sign-in and can include any of the user/sign-in data elements described above with regard to FIG. 1, including the user/sign-in data +n elements and even third party data 730 (e.g., data that may indicate a user's credential has been leaked, detected user status with another system, or any other third party data) and/or any other data 740 that is detected by the system. This other data 740, for example, can include supplemental user behavior analysis data that tracks activities of the user after the user has successfully logged into the system and/or responses by the user to follow-up security questions or requests (e.g., multi-factor authentication requests or requests to validate status) or other user data or system data (e.g., changes in user position or title, changes in user subscription level, changes in security policies, etc.). This other data 740 and third-party 730 data can be considered with the detector data features and/or considered separately by the machine learning tools.

The detectors, as indicated above, reflect a combination of one or more user/sign-in data features or attributes that are interpretable, when present (or, in some instances when absent), to reflect a relative risk of a particular sign-in event or user behavior. In some instances, the system will be configured to monitor a few different types of detectors or tens or hundreds or even thousands of different detectors. The system determines when the conditions of a detector are satisfied by comparing the defined detector conditions (as specified by stored definitions for the detectors) to the stored user/sign-in data. In some instances, newly received user/sign-in data is also used to detect the occurrence of a detector for a sign-in event, even prior to persistently storing the user/sign-in data.

To illustrate how the current system is able to apply a multi-tier machine learning approach to the generation and modification of user risk scores, FIGS. 7 and 8 will represent different machine learning tools (ML1, ML2 and ML3) that are applied to some specific non-limiting examples of detectors (D1, D2, D3 and D4) associated with three different sign-in events (RS1, RS2 and RS3) corresponding to a particular user risk score ((User1) Sign-In Score).

In this example, detector 1 (also referred to herein as D1) can be a detection of an anonymous IP address/VPN, while detector 2 (also referred to herein as D2) can be a detection of one or more unfamiliar features (e.g., a unique combination of detected user location, browser, device, etc.), while detector 3 (also referred to herein as D3) can be an impossible logistic/location scenario (e.g., a detection of a previous login minutes before from a different device in a different location), and while detector 4 (also referred to herein as D4) can be a detected login from an address known to be associated with a particular botnet, FIG. 8 illustrates a machine learning environment that is used to improve user identification protections and computer system security. As shown in this embodiment, the sign-in data corresponding to a plurality of detectors (D1, D2, D3 & D4) is analyzed by a first machine learning tool (ML1) 810. In this example, the sign-in data 820 comprises stored and/or real-time user/sign-in data that is evaluated against stored patterns and definitions, such as stored in the risk profiles report 830, label data 835 or another detector definition data structure 840, which is stored by the cloud/service portal or that is otherwise accessible to the cloud/service portal. This sign-in data may also include or be supplemented with additional third-party data 845 and/or other supplemental user behavior analysis data 850, as previously described.

In this instance, the first machine learning tool (ML1) 810 evaluates the various detected sign-in data 820 and determines which detectors are present for the different sign-in events (e.g., RS1, RS2, RS3) and/or quantifies the risk of those different detectors as a quantified risk level set of sign-in detectors 860. In this example, the output of ML1 is the quantified risk of D1 for sign-in event RS1 set to medium (M), while the quantified risk of D3 for sign-in event RS1 is set to low (L). Likewise, the quantified risk of detectors D2 and D3 for sign-in event RS2 is set to high (H) and medium (M), respectively. Additionally, the quantified risk of detectors D1, D2 and D4 for sign-in event RS3 is set to medium (M), high (H) and low (L), respectively.

In this example, it is noted that not all detectors are set to the same quantified risk. For instance, the quantified risk of detector D3 is set to low (L) for sign-in event (RS1), but to medium (M) for sign-in event RS2. This may result from a difference in the characteristics of the sign-in events and/or the combination of different detectors that are detected and quantified for the different sign-in events (e.g., the occurrence of detectors D2 and D3 with a single sign-in event (RS2) may escalate the riskiness of D3, for example, as compared to the riskiness of D3 when it is coupled with detector D1 for sign-in event RS1). This quantified risk level set of sign-in detectors 860 is then provided to the next tier of the machine learning (e.g., machine learning tool ML2 (870)).

The quantified risk level set of sign-in detectors 860 can also be stored for further use, down the road, can be used to dynamically update other stored data and/or fed directly into a same or additional machine learning tool (810, 870) that considers this information alone and/or in combination with any of the other data (e.g., supplemental user behavior analysis data 850, third party data 845, risk profiles report 830, detector definitions 840, label data 835, etc.) to generate a new/modified quantified risk level set of sign-ins 875.

For instance, the new quantified risk level set of sign-in detectors 860 can be provided as feedback to update the risk profiles report 830, detector definitions 840 or label data 835 for further machine learning analysis for further tuning one or more of the machine learning tool(s) 810, 870 and/or 880. This quantification of the detectors may also trigger the system to request additional information from the user, an administrator or a third party, which can also be further used by the machine learning tool (ML1) 810 to identify and/or quantify one or more of the detector(s) in a feedback loop. This could, in some instances, result in a change to one of the detectors that are identified and/or quantified, as well as changing a quantified risk level of the detector(s) 860.

In the present example, the second layer of machine learning is applied by machine learning tool (ML2) 870 to generate a quantified risk level set of sign-ins 875 based on the different sign-in events corresponding to the quantified detectors. In this example, sign-in event RS1 is shown to have a quantified risk of low (L), while sign-in events (RS2) and (RS3) have quantified risks of medium (M) and (H). This resulted from machine learning tool (ML2) determining that the combination of D1 and D3 having risk levels M and L, respectively, is quantifiable as a low (L) risk for RS1, and that the combination of D2 and D3 having risk levels H and M, respectively, corresponds to a quantifiable medium (M) risk for RS2, and that the combination of D1, D2 and D3 having corresponding risk levels of M, H and L, corresponds to a quantifiable high (H) risk for RS3.

This quantified risk level set of sign-ins 875 can then be fed to another layer of machine learning (e.g., machine tool ML3 (880)) for quantifying the overall user sign-in score (alone or in combination with the other available data mentioned before, such as, but not limited to, third-party data 845 and label data 835). The quantified risk level set of sign-in data can also be used to further update or modify the data used during application of the machine learning (e.g., the risk profiles report 830, detector definitions 840, label data 835, triggering the request additional for additional user or third party data 845, etc.) that is used by ML1 810 and ML2 870 and which can result in a modification to the identification and quantification of the detectors 860 and sign-ins 860 (e.g., sign-in events) and/or tuning of the machine learning tools (810, 870 and 880).

Next, as shown, machine learning is applied by another machine learning tool (ML3) 880, alone and/or in combination with the other available data (e.g., the risk profiles report 830, detector definitions 840, label data 835, etc.) to quantify the user sign-in score. In this instance, ML3 880 has quantified the risk sign-in score as medium (M). This quantification can further be used to update or modify the data used during application of the machine learning (e.g., the risk profiles report 830, detector definitions 840, label data 835, triggering the request additional for additional user or third party data 845, etc.) and that is used by ML1 810, ML2 870 and/or ML3 880 and which can further result in a modification to the identification and quantification of the detectors 860, sign-in events 875 and sign-in score 890, as well as the tuning of the machine learning tools.

This process can iterate (in serial and parallel), dynamically improving the ability of the machine learning tools to accurately and responsively generate and modify user sign-in scores in response to newly detected sign-in events and new evaluations of previously evaluated/quantified sign-in events. It has been found by the inventors that generating and modifying user risk scores with this system and in this manner can significantly improve the usability of user risk scores by simultaneously improving both the precision and recall of the user risks scores, in a way that has not been previously possible. In fact, as noted in the background, precision and recall typically have a typically inversely proportional relationship. But, not necessarily when utilizing the current embodiments.

Notably, as indicated above, the modification or result of one machine learning output at a first level of machine learning analysis can trigger a further modification by the same level of machine learning and/or by another level of machine learning. This can result in the generation of new/modified user sign-in scores for a user (which may be their actual identity risk score or a component of their identity risk score), even though this means that the system retroactively re-evaluates stored user/sign-in data that was previously evaluated for generating an earlier risk score.

Likewise, the impact of a modification to a first user's risk score or scoring component can cause a further modification to a different user's risk score or scoring component. For instance, with respect to the machine learning environment 900 shown in FIG. 9, a second user (User2) may also have a sign-in score 910 based on different sign-in events associated with that second user (e.g., RS4, RS5 and RS6), but which also include similar or the same detectors that were quantified by ML1 for sign-in events RS1, RS2 and RS3. Accordingly, as the various machine learning tools (ML1, ML2 and ML3) are iteratively applied to the sign-in components associated with the User2 sign-in score (D1, D2, D3, D4, RS4, RS5 and RS6), they will cause a new/modified user2 sign-in score to be created. This is true, even if the second user has not triggered any new sign-in data and even though there has not been a change to actual stored sign-in data associated with the second user since their previous user2 risk score was created off of an initial/previous analysis of their stored sign-in data.

It will be appreciated that the foregoing embodiment can be particularly beneficial for situations for preventing bad actors from launching their first attack against a system, even though they may have been assigned a low risk score and by dynamically adjusting their risk score to a heightened state, prior to an attempted cyberattack, based on the iterative reevaluation process that includes modifying the way a machine learning tool quantifies a particular scoring attribute in response to a quantification or analysis performed for a different user.

With regard to the foregoing examples, it will also be appreciated that the quantity and combination of sign-in events and detectors shown for each of the different sign-in events is merely provided in these figures to help illustrate the functionality of the multitier machine learning that is applied when generating/modifying the user risk scores and should not, therefore, considered to exhaustive or restrictive with regard to the scope of the claims. Likewise, it will also be appreciated that the different sign-in events can comprise complete and separate sign-in events or merely separate portions of a single sign-in process.

It will also be appreciated, with regard to the foregoing, that the machine learning tools can be incorporated into a single system or multiple different systems modules and algorithms and can include various types of machine learning algorithms (which are known to those of skill in the art), in order to accommodate different needs and preferences.

As shown, FIG. 10 illustrates a flowchart 1000 of methods that are specifically related to improving precision and recall utility for user identity risk scores that are utilized in providing computer security. These methods include, as shown, a computing system accessing stored sign-in data for each sign-in event in a set of sign-in events corresponding to a first user. This sign-in data may be stored for any predetermined period(s) of time (as previously described), to be used iteratively in the machine learning processes described. It is also noted that this set of sign-in events may comprise any combination of one or more sign-in event(s).

Next, based on the stored sign-in data, and based on risk profiles associated with the stored sign-in data, the computing system identifies a set of sign-in detectors for each sign-in event in the set of sign-in events corresponding to the first user. Notably, this set of sign-in detectors may comprising one or more sign-in detector(s) for each of the one or more sign-in event(s) and may be defined in a stored definition of detectors or detector features. Each detector may also include one or more different combinations of user/sign-in event data, third party data and/or user behavior data that occurs after a user signs into or accesses a system.

Next, the computer system generates a quantified risk level set of sign-in detectors by applying a first machine learning tool to the set of sign-in detectors to quantify a relative risk level associated with each sign-in detector of the set of sign-in detectors. Any suitable and trained machine learning tool/algorithm can be used, such as machine learning tool ML1 (referenced above), and which may include an analysis of external data elements as well (e.g., third party data, user behavior data, system policy data, etc.).

Next, the computer system generates a quantified risk level set of sign-ins by applying a second machine learning tool to the quantified risk level set of sign-in detectors to quantify a relative risk level associated with each sign-in event in the set of sign-in events. Any suitable and trained machine learning tool/algorithm can be used, such as machine learning tool ML2 (referenced above), and which may include an analysis of external data elements as well (e.g., third party data, user behavior data, system policy data, etc.).

Next, the computer system generates a first user identity risk score by applying a third machine learning tool to the quantified risk level set of sign-ins to quantify a relative risk level associated with the first user. Any suitable and trained machine learning tool/algorithm can be used, such as machine learning tool ML3 (referenced above), and which may include an analysis of external data elements as well (e.g., third party data, user behavior data, system policy data, etc.).

The computing system also iteratively and dynamically updates the first user identity risk score or generates a new first user identity risk score by reapplying the third machine learning tool to the quantified risk level set of sign-ins. By generating and storing multiple different user scores, it is possible to evaluate risk trends associated with different users.

To further benefit this analysis, new scores can be generated or stored on a predetermined interval. Alternatively or additionally, the new scores can be generated and/or stored on demand and/or in response to detecting a triggering condition, such as the generation or modification of another score associated with a different user, detection of a new sign-in event for the user or another user, etc.

Some additional example and alternative embodiments will now be described to further illustrate the benefits and flexibility of the disclosed concepts.

In some instances, the new or modified first user identity risk score is generated after generating the first user identity risk score and prior to detecting any new sign-in event associated with the first user. Such that the user's score is retroactively modified, based on previously analyzed data.

In some embodiments, the computer system detects a new sign-in event for the first user and the new sign-in event data for the new sign-in event is added to the stored sign-in event data. Then, based on the new sign-in event, the computer system identifies a new set of sign-in detectors, which is subsequently used to generate a new quantified risk level set of sign-in detectors through application of the first machine learning tool, and which is further used to generated a new quantified risk level set of sign-ins through application of the second machine learning tool, and which is even further used to generate the new first user identity risk score by applying the third machine learning tool.

In some embodiments, the a new second user identity risk score is generated a second user that is different than a previous second user identity risk score that was generated for the second user (which was based on a previous application of the first machine learning tool to a set of sign-in detectors associated with sign-in events of the second user), and wherein the generating of the new second user identity risk score is performed automatically in response to the application of the first machine learning tool to the set of sign-in detectors in the set of sign-in events of the first user and which resulted in a modification of the first machine learning tool and/or data utilized by the first machine learning tool when the first machine learning tool is applied.

In some embodiments, the computer system generates the new first user identity risk score by modifying the quantified risk level set of sign-ins by reapplying the second machine learning tool to the quantified risk level set of sign-in detectors prior to reapplying the third machine learning tool.

In some embodiments, the computer system generates the new first user identity risk score by modifying the quantified risk level set of sign-in detectors by reapplying the first machine learning tool to the set of sign-in detectors prior to reapplying the second machine learning tool.

In some embodiments, the computer system detects a user request from the first user corresponding to a new sign-in event or sign-in event data (which may comprise user behavior and third party data) that is not stored and/or that does not have any stored sign-in event data and responsively identifies (in real-time) the new first user identity risk score corresponding to the user by applying the machine learning tools and in the manner described with reference to stored sign-in event data. Then, in response to determining that the new first user identity risk score exceeds a predetermined threshold, the computer system dynamically triggers a remedial action (e.g., requesting the first user provide supplemental authentication or verification information or denying a request), or alternatively, in response to determining the new first user identity risk score falls below a predetermined threshold, grants the user request. This way, the system can dynamically respond to new conditions appropriately. This may include granting some user requests upon receiving initial requests (when a user's risk level is below a threshold) and then denying user request upon receiving subsequent requests (when the user's risk level has been modified to be above the threshold).

In some embodiments, the analysis of one machine learning tool can trigger the subsequent analysis by an additional machine learning tool. For instance, in one embodiment, the analysis of machine learning tool ML1 can trigger the analysis of ML2 and which can trigger the analysis of ML3 for generating the first user identity risk score, wherein each of the different analysis can include a consideration of other data, such a subsequent user behavior analysis and/or third-party data to quantify a relative risk level associated with the corresponding user. In some embodiments, the system may also trigger a query or request for the subsequent user behavior analysis and/or third-party data in response to determining that a quantified risk level of a sign-in detector in the quantified risk level set of sign-in detectors exceeds a predetermined threshold and/or that a quantified risk level of a sign-in exceeds a predetermined threshold.

In view of the foregoing description, it will be appreciated that the disclosed methods and systems can be used to improve the manner in which computer security is implemented, particularly for computer systems that utilize user risk profiles and sign-in risk profiles to implement their security systems.

The disclosed embodiments can be particularly useful for enabling each of the customers of a system to benefit from the feedback given by other customers of the same system. This benefit will multiply as the quantity of customers within the system, such as Microsoft's Azure Active Directory system, or any other system, grows. In particular, the feedback that is provided by the different customers across a system (which may be received throughout the world in some instances), can lead to an identification of an attacker based on various factors (e.g., IP, browser, location, cookies, network, etc.) and that can be used in the disclosed crowd-sourced feedback loops to help prevent attacks to other customers in near real-time. In other words, it is not just the machine learning algorithms that are tuned and that benefit from the feedback, but actual customers in near real-time.

It will also be appreciated that the disclosed systems and methods do more than merely restrict access to content. But, they can also be used to provide proactive remediation of risk through credential resets, credential expiation and credential demotion.

Finally, it will also be appreciated that the foregoing description of providing computer system security comprises or includes providing specific 'identity' security, by helping to provide identity scores or identity risk scores that are dynamically updated in view of crowdsourced feedback and that are, therefore, usable to help improve the precision and recall of the identity scores.

The foregoing methods may be practiced by a computer system, such as the computing system described in reference to FIG. 1 and which may include one or more processors (not illustrated) and computer-readable media such as computer memory. In particular, the computer memory may store computer-executable instructions that when executed by one or more processors cause various functions to be performed, such as the acts recited in the embodiments.

In this regard, the disclosed embodiments may comprise or utilize a special purpose or general-purpose computer or computing system (which may include a cloud service computing system) and which includes computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that facilitates recall utility for identity risk scores, said computer system comprising:
   one or more processors; and
   one or more computer-readable hardware storage devices that store instructions that are executable by the one or more processors to cause the computer system to:
   access data associated with a set of sign-in events corresponding to an entity;
   based on the data, identify a set of sign-in detectors, wherein the set of sign-in detectors includes one or more sign-in detectors for each sign-in event in the set of sign-in events;
   generate a set of quantified risk levels based on the set of sign-in detectors by applying a group of one or more machine learning tools to the set of sign-in detectors;
   generate an identity risk score for the entity, wherein generating the identity risk score is based on the set of quantified risk levels;
   use the identity risk score to update data used to train a machine learning tool selected from the group of one or more machine learning tools;
   based on the updated data, further tune the machine learning tool, resulting in at least one machine learning tool in the group of one or more machine learning tools being further trained;
   iteratively update the identity risk score for the entity or generate a new identity risk score for the entity by reapplying the group of one or more machine learning tools to generate a new set of quantified risk levels;

in response to iteratively updating the identity risk score for the entity or in response to generating the new identity risk score for the entity, modify a second identity risk score for a second entity, wherein modifying the second identity risk score is performed independently to new sign-in data being received for the second entity such that a modification to the identity risk score impacts the second identity risk score;

detect a request from the entity, which corresponds to a new sign-in event;

identify the new identity risk score corresponding to the entity; and in response to determining the new identity risk score exceeds a predetermined threshold, trigger a remedial action to the request, or alternatively, in response to determining the new identity risk score falls below the predetermined threshold, grant the request.

2. The computer system of claim 1, wherein the identity risk score is for a user.

3. The computer system of claim 1, wherein the identity risk score is quantified and is represented in a form of a numeric.

4. The computer system of claim 1, wherein the identity risk score is quantified and is represented as one of a high risk, a medium risk, or a low risk.

5. The computer system of claim 1, wherein the identity risk score is quantified and is represented in binary form as risk or no risk.

6. The computer system of claim 1, wherein the identity risk score is for a computing entity.

7. The computer system of claim 1, wherein the set of sign-in events is stored for a predetermined period of time before aging out.

8. The computer system of claim 1, wherein the set of sign-in events is stored in a ring buffer.

9. The computer system of claim 1, wherein the group of one or more machine learning tools include or use one or more of the following: a linear regression model, a logistic regression model, or a support vector machine.

10. The computer system of claim 1, wherein the set of sign-in events include data associated with one or more of: a suspicious device, a new device, an atypical or typical location, an anonymous Internet Protocol (IP) address, a familiar or unfamiliar IP address, credentials that are known to have been leaked, a device known to have been infected with malware, or a location that is distant from a known location of a user.

11. A method comprising:
accessing data associated with a set of sign-in events corresponding to an entity;
based on the data, identifying a set of sign-in detectors, wherein the set of sign-in detectors includes one or more sign-in detectors for each sign-in event in the set of sign-in events;
generating a set of quantified risk levels based on the set of sign-in detectors by applying a group of one or more machine learning tools to the set of sign-in detectors;
generating an identity risk score for the entity, wherein generating the identity risk score is based on the set of quantified risk levels;
using the identity risk score to update data used to train a machine learning tool selected from the group of one or more machine learning tools;
based on the updated data, further tuning the machine learning tool, resulting in at least one machine learning tool in the group of one or more machine learning tools being further trained;
iteratively updating the identity risk score for the entity or generate a new identity risk score for the entity by reapplying the group of one or more machine learning tools to generate a new set of quantified risk levels;
in response to iteratively updating the identity risk score for the entity or in response to generating the new identity risk score for the entity, modifying a second identity risk score for a second entity, wherein modifying the second identity risk score is performed independently to new sign-in data being received for the second entity such that a modification to the identity risk score impacts the second identity risk score;
detecting a request from the entity, which corresponds to a new sign-in event;
identifying the new identity risk score corresponding to the entity; and
in response to determining the new identity risk score exceeds a predetermined threshold, triggering a remedial action to the request.

12. The method of claim 11, wherein the remedial action includes preventing access to a resource.

13. The method of claim 11, wherein the remedial action includes initiating a request for additional authentication.

14. The method of claim 11, wherein the remedial action includes triggering expiry of a current access right.

15. The method of claim 11, wherein the remedial action includes triggering demotion of a current access right.

16. The method of claim 11, wherein a crowdsourced feedback loop is implemented to further tune the machine learning tool.

17. The method of claim 11, wherein the identity risk score is for a user.

18. The method of claim 11, wherein the identity risk score is for a computing entity.

19. A method comprising:
accessing data associated with a set of sign-in events corresponding to an entity;
based on the data, identifying a set of sign-in detectors, wherein the set of sign-in detectors includes one or more sign-in detectors for each sign-in event in the set of sign-in events;
generating a set of quantified risk levels based on the set of sign-in detectors by applying a group of one or more machine learning tools to the set of sign-in detectors;
generating an identity risk score for the entity, wherein generating the identity risk score is based on the set of quantified risk levels;
using the identity risk score to update data used to train a machine learning tool selected from the group of one or more machine learning tools;
based on the updated data, further tuning the machine learning tool, resulting in at least one machine learning tool in the group of one or more machine learning tools being further trained;
iteratively updating the identity risk score for the entity or generate a new identity risk score for the entity by reapplying the group of one or more machine learning tools to generate a new set of quantified risk levels;
in response to iteratively updating the identity risk score for the entity or in response to generating the new identity risk score for the entity, modifying a second identity risk score for a second entity, wherein modifying the second identity risk score is performed independently to new sign-in data being received for the second entity such that a modification to the identity risk score impacts the second identity risk score;

detecting a request from the entity, which corresponds to a new sign-in event;

identifying the new identity risk score corresponding to the entity; and in response to determining the new identity risk score falls below the predetermined threshold, granting the request.

20. The method of claim 19, wherein the identity risk score is for a computing entity.

* * * * *